United States Patent
Losee et al.

(10) Patent No.: US 10,284,003 B2
(45) Date of Patent: May 7, 2019

(54) END-USER BASED BACKUP MANAGEMENT

(71) Applicant: General Electric Company, Schenectady, NY (US)

(72) Inventors: Marc Karl Losee, Woodstock, GA (US); Vernon Meadows, Lilburn, GA (US); Jerry Steven Massey, Lawrenceville, GA (US); Kamal Kumar Arvind, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 361 days.

(21) Appl. No.: 13/647,654

(22) Filed: Oct. 9, 2012

(65) Prior Publication Data

US 2014/0100671 A1 Apr. 10, 2014

(51) Int. Cl.
| | | |
|---|---|---|
| *H02J 7/34* | (2006.01) | |
| *H02J 3/14* | (2006.01) | |
| *H02J 7/00* | (2006.01) | |
| *H02J 9/06* | (2006.01) | |
| *H02J 13/00* | (2006.01) | |

(52) U.S. Cl.
CPC ........ *H02J 7/34* (2013.01); *H02J 3/14* (2013.01); *H02J 7/0013* (2013.01); *H02J 9/06* (2013.01); *H02J 13/0006* (2013.01); *H02J 2003/146* (2013.01); *Y02B 70/3225* (2013.01); *Y02B 90/222* (2013.01); *Y04S 20/12* (2013.01); *Y04S 20/222* (2013.01); *Y04S 20/224* (2013.01)

(58) Field of Classification Search
CPC ........................ Y02B 70/3291; Y04S 20/244
USPC ......................................................... 700/22
See application file for complete search history.

(56) References Cited

U.S. PATENT DOCUMENTS

| 7,590,472 B2 * | 9/2009 | Hakim ................ H02J 3/32 |
| | | 700/291 |
| 7,747,739 B2 | 6/2010 | Bridges et al. |
| 7,944,179 B2 * | 5/2011 | Labrunie et al. ........... 320/150 |
| 2003/0225483 A1 | 12/2003 | Santinato et al. |
| 2004/0128266 A1 * | 7/2004 | Yellepeddy et al. ......... 705/412 |

(Continued)

FOREIGN PATENT DOCUMENTS

| JP | 2002315193 | 10/2002 |
| JP | 2010512727 | 4/2010 |

(Continued)

OTHER PUBLICATIONS

U.S. Appl. No. 13/647,853, filed Oct. 9, 2012, Marc Karl Losee.

(Continued)

*Primary Examiner* — Tejal Gami
(74) *Attorney, Agent, or Firm* — Parks IP Law LLC

(57) ABSTRACT

A device includes a network interface and a processor. The network interface is configured to receive one or more preferences of a customer related to the charging of at least one backup device of the consumer. The network interface is also configured to receive at least one notification of at least one predicted power disturbance. The processor is configured to utilize the one or more consumer preferences and the at least one notification to generate a charging schedule of the at least one backup device and to generate one or more charging notifications for charging the at least one backup device. The one or more charging notifications are based on the charging schedule.

9 Claims, 2 Drawing Sheets

(56) References Cited

U.S. PATENT DOCUMENTS

| | | | |
|---|---|---|---|
| 2006/0276938 A1* | 12/2006 | Miller | 700/295 |
| 2008/0039980 A1* | 2/2008 | Pollack | B60L 11/1824 700/295 |
| 2009/0088907 A1* | 4/2009 | Lewis et al. | 700/286 |
| 2009/0210357 A1 | 8/2009 | Pudar et al. | |
| 2010/0213895 A1* | 8/2010 | Keating et al. | 320/108 |
| 2011/0015799 A1* | 1/2011 | Pollack et al. | 700/291 |
| 2011/0046792 A1 | 2/2011 | Imes et al. | |
| 2011/0299547 A1* | 12/2011 | Diab et al. | 370/401 |
| 2012/0166004 A1 | 6/2012 | Park et al. | |
| 2012/0309455 A1* | 12/2012 | Klose | B60L 11/1838 455/557 |

FOREIGN PATENT DOCUMENTS

| | | |
|---|---|---|
| JP | 2011196826 | 10/2011 |
| JP | 2012-023955 A | 2/2012 |
| JP | 2012-175791 A | 9/2012 |
| WO | 2011055975 A2 | 5/2011 |
| WO | 2011/065495 A1 | 6/2011 |
| WO | WO 2012134495 A1 * | 10/2012 |

OTHER PUBLICATIONS

Marc Karl Losee, et al., U.S. Appl. No. 13/647,853, filed Oct. 9, 2012.
Non-Final Office Action issued in connection with related U.S. Appl. No. 13/647,853 dated Jan. 5, 2016.
English Abstract of JP2002315193.
English Abstract of JP2011196826.
Office Action in corresponding Japanese Patent Application No. 2013-209764, dated May 16, 2017.
Notification of Reasons for Refusal issued in connection with corresponding JP Application No. 2013-209764 dated Aug. 29, 2017.
Machine Translation and Office Action issued in connection with corresponding MX Application No. MX/a/2013/011759 dated Dec. 13, 2017.

* cited by examiner

END-USER BASED BACKUP MANAGEMENT

BACKGROUND

The subject matter disclosed herein relates generally to systems for power management, and more specifically, to a system for managing storage of backup devices of a consumer using an advanced metering infrastructure.

A utility system provides power to facilities connected to a power grid. Power grids periodically experience power disturbances, such as blackouts or brownouts, due to inclement weather or overloading of the power system. Accordingly, consumers may have backup devices to power loads during these disturbances. Unfortunately, consumers may not have adequate information to allow for efficient management of the backup devices. For example, consumers are often unaware of the timing and duration of upcoming power disturbances. Thus, some consumers may be unprepared for the disturbance and may not have a sufficient charge level of their backup devices. Other consumers may keep their backup devices fully charged at all times. However, keeping backup devices fully charged at all times may be expensive and may reduce the life of the backup devices.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a device includes a network interface and a processor. The network interface is configured to receive one or more preferences of a customer related to the charging of at least one backup device of the consumer. The network interface is also configured to receive at least one notification of at least one predicted power disturbance. The processor is configured to utilize the one or more consumer preferences and the at least one notification to generate a charging schedule of the at least one backup device and to generate one or more charging notifications for charging the at least one backup device. The one or more charging notifications are based on the charging schedule.

In a second embodiment, a non-transitory computer-readable medium has computer executable code stored thereon. The code includes instructions for receiving one or more preferences of a consumer related to the charging of at least one backup device of the consumer. The code also includes instructions for receiving at least one notification of at least one predicted power disturbance. Further, the code includes instructions for generating a charging schedule of the at least one backup device based on the one or more preferences of a consumer and the at least one notification of at least one predicted power disturbance. The code includes instructions for generating one or more charging notifications for charging the at least one backup device. The one or more charging notifications are based on the charging schedule.

In a third embodiment, a device includes a network interface and a processor. The network interface is configured to receive, from a backup management system of a consumer, one or more charging notifications relating to charging of at least one backup device. The one or more charging notifications are based on a charging schedule generated from preferences of the consumer related to the charging of the at least one backup device. The processor is configured to generate and implement a charging program for the at least one backup device based on the one or more charging notifications.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
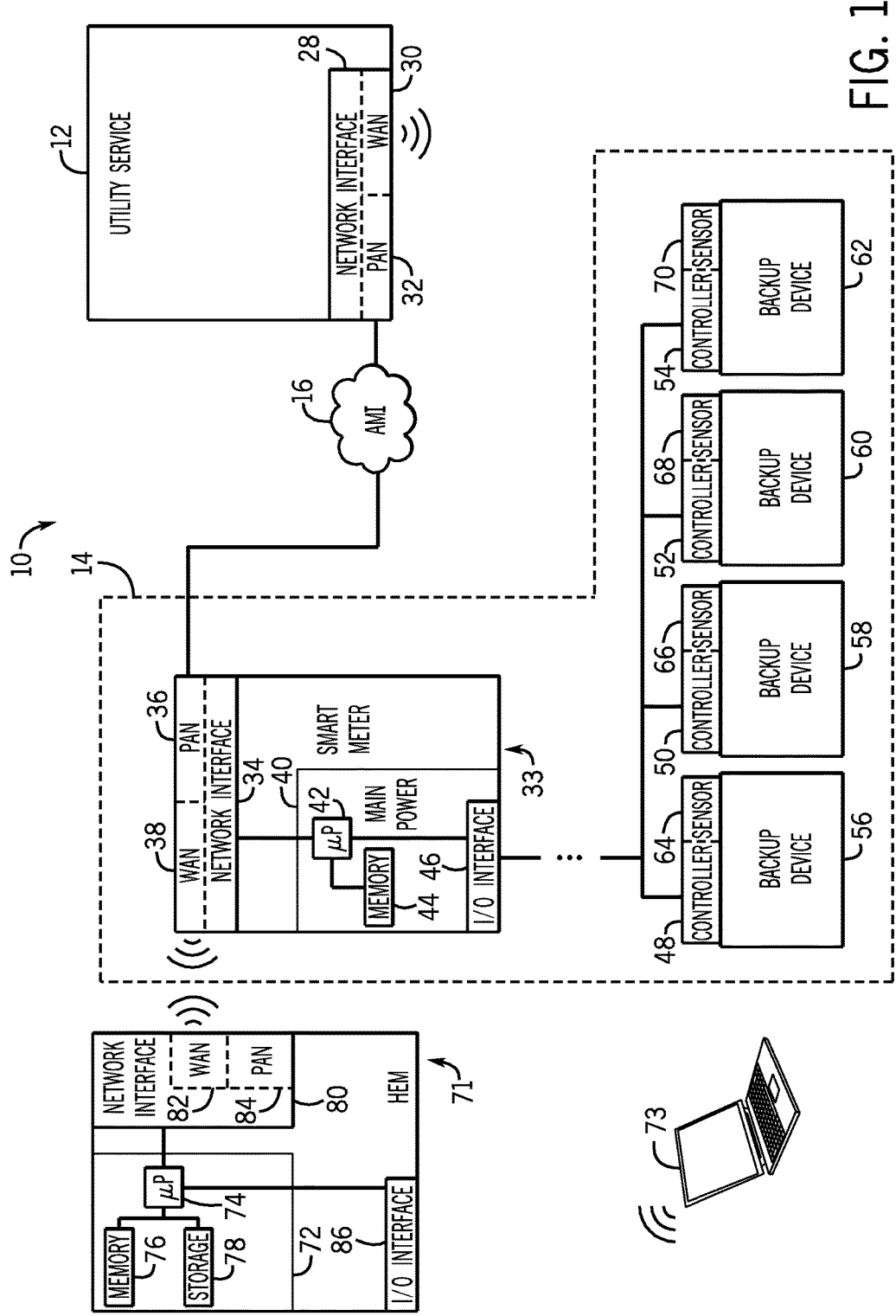
FIG. 1 is a block diagram of an embodiment of a utility system that includes a backup management system configured to manage backup devices at a reduced cost.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments relate to a utility communication system with a backup management system configured to manage backup devices of a facility in accordance with a consumer's preferences. As previously discussed, many consumers have backup devices to power their facilities in the event of a power disturbance, such as a blackout or brownout. However, the consumer may not have prior information relating the power disturbance, such as occurrence or duration, to allow for efficient management of the backup devices. As such, the disclosed embodiments provide a utility communication system with a backup management system, which may receive consumer preferences relating to their backup devices and use the consumer preferences to determine customized charging and switching schedules for the backup devices. In certain embodiments, a consumer may input preferences to the backup management system once, and the backup management system may automatically manage the backup devices of the consumer according to the received consumer preferences.

In other embodiments, a consumer may override the previously submitted preferences and input new preferences. As such, the backup management system may determine new charging and switching schedules for the backup devices. In particular, the backup device management system may receive information from a utility service, the consumer preferences, and/or the backup devices to create and implement a schedule for charging the backup devices at a reduced cost. Further, the backup device management system may prioritize energy use of certain devices during a power disturbance in accordance with the consumer preferences. Accordingly, the backup device management system may reduce the cost of recharging the backup devices and improve the likelihood that the backup devices are sufficiently charged before an upcoming power disturbance.

With the foregoing in mind, FIG. 1 illustrates a block diagram of an embodiment of a utility system 10 configured to deliver power to a consumer. The utility system 10 may be an element in a smart grid system, which includes power generation systems, power transmission and distribution systems, metering systems, digital communication systems, control systems, and their related components. The smart grid system enables the utility system 10 to improve capacity, improve energy distribution and usage, and to dynamically manage loads more effectively. As illustrated, the utility system 10 includes a utility service 12 that may communicate with a consumer facility 14 via an automated metering infrastructure (AMI) 16. The utility service 12 provides power and/or other utilities (e.g., water, natural gas, hydrogen, nitrogen, etc.) to the consumer facility 14. The consumer facility 14 may be any consumer of the utilities provided by the utility service 12. In certain embodiments, the consumer facility 14 may be a housing unit, a commercial building, or a manufacturing plant receiving power from the utility service 12. The AMI 16 may be used to measure, collect, and analyze electricity, water, and/or gas usage, thereby providing a link between consumer behavior and utility consumption. As illustrated, the consumer facility 14 includes elements that may reduce the cost of recharging backup devices and improve the likelihood that the backup devices are sufficiently charged before an upcoming power disturbance.

The utility service 12 includes a network interface 28. The network interface 28 may provide communication via a wide area network (WAN) 30 (e.g., a network that links across metropolitan or regional boundaries), a personal area network (PAN) 32 (e.g., a localized network that links across a particular geographic region which may typically be smaller than the range of a WAN), a local area network (LAN) (e.g., a network that that connects devices in a building such as a Wi-Fi connection), a physical connection (e.g., an Ethernet connection), and/or the like. As illustrated, the utility service 12 may communicate with the AMI 16 via the personal area network 32. The utility service 12 may communicate information about the occurrence and duration of upcoming power disturbances (e.g., brownouts or blackouts) to the consumer facility 14. Further, the upcoming power disturbances may be planned or unplanned. For example, the utility service may have a regularly scheduled maintenance that causes a slight power disturbance. Additionally or alternatively, severe weather may cause an unplanned power disturbance. As described in greater detail in FIG. 2, the consumer facility 14 may create a schedule for charging backup devices at a reduced cost and improve the likelihood that the backup devices are sufficiently charged before an upcoming power disturbance.

As illustrated, the consumer facility 14 includes a smart meter 33 that is communicatively coupled with the AMI 16 via a network interface 34, and more specifically, a PAN 36. In other embodiments, the smart meter 33 may communicate with the AMI 16 via a WAN 38, a LAN, a near field communication device, a physical connection, and/or the like. The consumer facility 14 may receive information about the occurrence and duration of upcoming power disturbances from the utility service 12 through the AMI 16 and create and implement a schedule for charging backup devices at a reduced cost. To this end, the consumer facility 14 includes a main board 40. The main board 40 may include one or more processors 42 and/or other data processing circuitry, such as memory 44, to execute instructions to determine a charging schedule for backup devices. These instructions may be encoded in software programs that may be executed by the one or more processors 42. Further, the instructions may be stored in a tangible, non-transitory, computer-readable medium, such as memory 44. Memory 44 may include, for example, random-access memory, read-only memory, rewritable memory, hard drive(s), and/or optical discs.

In the embodiment shown, the main board 40 may create and implement a schedule for charging backup devices 56, 58, 60, 62 based on information about upcoming power disturbances from the utility service 12. Accordingly, the main board 40 includes an I/O interface 46 that is communicatively coupled to the backup devices 56, 58, 60, 62. As described in detail further below, the main board 40 may selectively charge the backup devices 56, 58, 60, 62 at a reduced cost based on information from the backup devices, the utility service 12, and/or the consumer preferences, as directed by a consumer. For example, the main board 40 may selectively charge the backup devices 56, 58 and not charge the backup devices 60, 62 depending on the energy price and consumer preferences loaded passed to the main board 40.

The backup devices 56, 58, 60, and 62 may be any suitable backup device such as a backup battery or uninterruptable power source (UPS). The main board 40 may send a signal through I/O interface 46 to one or more controllers to activate the corresponding backup device(s). The controllers 48, 50, 52, and 54 may include sensor portions 64, 66, 68, and 70. The sensor portions 64, 66, 68, and 70 may, for example, be integrated into the backup devices 56, 58, 60, and 62, respectively. Alternatively, the sensor portions 64, 66, 68, and 70 may be independent from and electrically coupled to the backup devices 56, 58, 60, and 62. The sensor portions 64, 66, 68, and 70 may, for example, be configured to read the charge of the respective backup device 56, 58, 60, and 62, and may also include a transmitter for communicating with the smart meter 33 via LAN 38. As such, the backup devices 56, 58, 60, and 62 may communicate with the smart meter 33 directly via I/O interface 46. The controllers 48, 50, 52, 54 may control their respective backup devices 56, 58, 60, 62 independently of one another.

The sensors 64, 66, 68, 70 are communicatively coupled to the controllers 48, 50, 52, 54 and the backup devices 56, 58, 60, 62. The sensors 64, 66, 68, 70 are configured to detect and/or measure a parameter (e.g., charge level) of the respective backup devices 56, 58, 60, 62, and may also include a transmitter for communicating these parameters with the smart meter 33 via the network interface 34 or the I/O interface 46. Further, the sensors 64, 66, 68, 70 may detect and/or measure one or more parameters simultaneously, such as charge level, temperature, internal resistance, current, voltage, and/or the like. Further, the sensors 64, 66, 68, 70 may continuously or discretely detect and/or measure the one or more parameters. As may be appreciated, the sensors 64, 66, 68, 70 may communicate the detected and/or measured parameters to the main board 40 such that the charging schedule of the backup devices 56, 58, 60, 62 may be based partially on these detected and/or measured parameters.

As illustrated, the smart meter 33 is also communicatively coupled to a home energy manager (HEM) 71. In certain embodiments, the HEM 71 may be a wall plug-in unit or a standalone device that may receive consumer preferences from a consumer via a network interface 80 and communicate the preferences to the smart meter 33. The consumer may input the preferences via an input device (e.g., laptop 73) that communicates with a network interface 80 of the HEM 71. In other embodiments, the input device may be a desktop computer, a smart phone, a control panel on the HEM 71, or another suitable input device. As illustrated, the consumer preferences are transmitted over a PAN 84 of the network interface 80. In other embodiments, the consumer preferences may be transmitted over a WAN 82, a LAN, and/or the like. The consumer preferences may be saved in storage 78 and may be retrieved by one or more processors 74. Additionally, the HEM 71 includes an I/O interface 86 that may be communicatively coupled to the backup devices 56, 58, 60, 62.

As discussed previously, the main board 40 of the smart meter may implement a charging schedule for the backup devices 56, 58, 60 62, as determined by the HEM 71. To this end, the HEM 71 includes a backup management system (BMS) 72. The BMS 72 may include the one or more processors 74 and/or other data processing circuitry, such as memory 76, to execute instructions to determine a charging schedule for the backup devices 56, 58, 60, 62. These instructions may be encoded in software programs that may be executed by the one or more processors 74. Further, the instructions may be stored in a tangible, non-transitory, computer-readable medium, such as memory 76. Memory 76 may include, for example, random-access memory, read-only memory, rewritable memory, hard drive(s), and/or optical discs. Moreover, while this BMS 72 will be described as being located in the HEM 71, in some embodiments, the BMS may also be located in the smart meter 33 and may operate in a similar fashion as when it is physically separated from the smart meter 33.

As may be appreciated, the consumer preferences (e.g., loaded into the HEM 71 by a customer) may include information for the management of the backup devices 56, 58, 60, 62. For example, the consumer preference may include the number and type of backup devices, a physical address of each backup device, the loads the backup devices 56, 58, 60, 62 may to support during a power disturbance, the priority of the loads, a minimum amount of charge for each backup device, a maximum energy cost, and/or the like. For example, a consumer may have the four backup devices 56, 58, 60, 62, but may desire only two of the backup devices 56, 58 to be fully charged at all times to support the loads. Further, the consumer may elect to charge backup devices 56, 58 regardless of the energy cost. As described in detail further in FIG. 2, the consumer may conditionally charge the remaining backup devices 60, 62 depending on the energy cost. Thus, the consumer may elect to forgo charging the remaining backup devices 60, 62 if the energy cost is too high, for example during the critical peak price (CPP). As may be appreciated, energy cost may generally be cyclical throughout a day, and may include periods of cheaper energy cost relative to the CPP. Therefore, the BMS 72 may automatically create a schedule, based on the consumer preferences, for charging the backup devices 56, 58, 60, 62 at a reduced cost while improving the likelihood that the backup devices 56, 58, 60 62 are sufficiently charged before an upcoming power disturbance communicated by the utility service 12. This schedule may be communicated to the smart meter 33 for implementation, as further described in FIG. 2.

Figure 2:
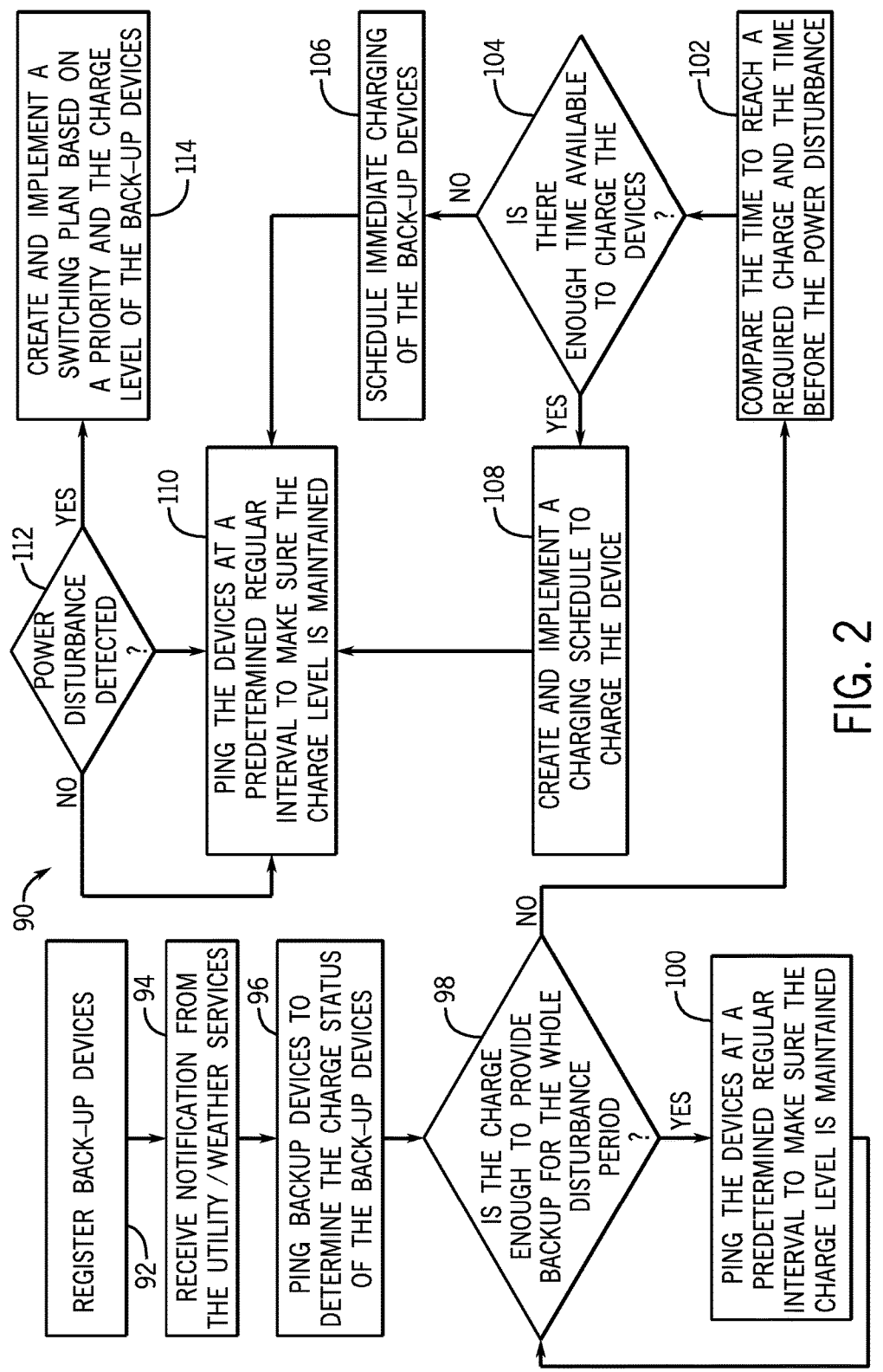
FIG. 2 is a flowchart of an embodiment of a method for managing backup devices of a consumer, as performed by the backup management system of FIG. 1.

FIG. 2 is a flowchart of a method 90 to manage the backup devices 56, 58, 60, 62 using the BMS 72. While this method will be described with respect to the BMS 72 of the HEM 71, in certain embodiments, the method 90 may be implemented partially or entirely by the smart board 40 performing the actions of the BMS 72 in the smart meter 33. A consumer registers (block 92) the backup devices 56, 58, 60, 62 with the HEM 71, which may include inputting the physical address of each backup device, the type (e.g., battery, uninterruptible power supply) of each backup device, and the number backup devices (e.g., 1, 2, 3, 4, 5, or more). Registering (block 92) the backup devices may also include inputting a load each backup device may support during a power disturbance, a priority of the loads, and other consumer preferences, as discussed previously. It should be appreciated that the consumers may update their preferences at any time, and these updated preferences may restart or alter the method 90.

The BMS 72 receives (block 94) notification of an upcoming power disturbance from the utility service 12 or from weather services, such as a geographic information system. For example, the utility service 12 may determine that a power grid system is overloaded and notify the BMS 72 via the AMI 16. Additionally or alternatively, weather services may detect upcoming severe weather and alert the BMS 72. Further, the BMS 72 may also receive (block 94) information from the utility service 12 about current or future energy costs, including information about the critical peak price. The BMS 72 pings (block 96) the backup devices 56, 58, 60, 62, for example, via the smart meter 33 to determine the charge status of each backup device. As discussed previously, the backup devices have sensors 64, 66, 68, 70 that may detect and/or measure one or more parameters. Specifically, the sensors 64, 66, 68, 70 may measure a charge level or available charge ($C_c$) of each backup device and may communicate the charge level to the smart meter 33 for transmission to the BMS 72 when the BMS 72 pings (block 96) the backup devices.

The BMS 72 determines (block 98) if the charge levels of the backup devices 56, 58, 60, 62 are sufficient to support the loads for the whole power disturbance. Accordingly, the BMS 72 may retrieve the consumer preferences in storage 78, and may analyze the preferences in the processor 74 using various algorithms, to determine (block 98) if the charge levels are sufficient. For example, in determining (block 98) if the charge levels are sufficient, the BMS 72 may determine a total charge desired ($C_r$) to support the selected loads for the disturbance period, based on the rates of power consumption of the loads and the consumer preferences. Additionally or alternatively, the $C_r$ may be partially determined by historical data of prior consumption. For example, if the average power consumption is 400 watts (W), the $C_r$ may be estimated using the average power consumption.

A charge difference ($C_n$) between the charge desired and the charge available may be calculated by subtracting $C_r$ from $C_c$. For example, if the $C_r$ is 400 W-h and the $C_c$ is 500 watt-hours (W-h), then the $C_n$ is 100 W-h. When $C_n$ is greater than zero or equal to approximately zero, the available charge of the backup devices 56, 58, 60, 62 may be sufficient to support the loads during the power disturbance. Thus, the backup devices 56, 58, 60, 62 may support the loads without additional charging. However, when $C_n$ is less than zero, the available charge of the backup devices 56, 58,

60, 62 may be insufficient to support the loads during the power disturbance. Thus, the backup devices 56, 58, 60, 62 may be further charged to improve the likelihood that the backup devices are sufficiently charged before the upcoming power disturbance.

While the available charge is sufficient for the entire power disturbance period, the BMS 72 may periodically ping (block 100) the backup devices 56, 58, 60, 62 to ensure the charge level is maintained and/or still sufficient for the entire power disturbance period. The BMS 72 may ping (block 100) at regular intervals, such as hourly or daily. However, if the BMS 72 determines (block 98) that the charge levels on the backup devices 56, 58, 60, 62 are insufficient, the BMS 72 may compare (block 102) the time desired to sufficiently charge the backup devices and the time available before the power disturbance in order to create and implement a charging schedule for charging the backup devices 56, 58, 60, 62.

As discussed previously, the BMS 72 may receive notification from the utility service 12 or weather services about an amount of time before the power disturbance (i.e. time available or $T_a$). Additionally, the BMS 72 may communicate with the smart meter 33 to receive information relating to the rates of charging and/or discharging of the backup devices 56, 58, 60, 62. In certain embodiments, the BMS 72 may use this information to approximate a time for the backup devices 56, 58, 60, 62 to become sufficiently charged for the entire power disturbance period (i.e., Time desired or $T_r$). For example, the BMS 72 may approximate a $T_r$ of 5 hours for the backup devices 56, 58, 60, 62 to become sufficiently charged (i.e., reach the desired charge $C_r$). The BMS 72 may compare (block 102) the time desired to sufficiently charge the backup devices and the time available before the power disturbance (i.e., compare $T_r$ and $T_a$) in order to create and implement a charging schedule for charging the backup devices 56, 58, 60, 62 at a reduced cost.

The BMS 72 may then determine (block 104) if there is enough time available to reach the require charge on the backup devices 56, 58, 60, 62. For example, if $T_a$ is greater than $T_r$, then there may be ample time to charge the backup devices 56, 58, 60, 62 and the BMS 72 may utilize periods of lower energy cost to charge the backup devices at a reduced cost. However, if $T_a$ is less than $T_r$, then there may be insufficient time to charge the backup devices 56, 58, 60, 62 to meet the desired charge. In such a scenario, the BMS 72 may schedule (block 106) immediate charging of one or more the backup devices 56, 58, 60, 62 in accordance with the consumer preferences. For example, the consumer may specify minimum charge levels on each of the backup devices (e.g., devices 56, 58, 60, 62), a maximum marginal cost or total cost of energy, or some combination thereof. For example, the charge on the backup devices 56, 58, 60, 62 may be insufficient for the entire power disturbance, but the consumer may not wish to pay the current marginal price for energy. In such a case, the backup devices 56, 58, 60, 62 may not be charged due to the consumer preferences. In certain embodiments, the BMS 72 may schedule (block 106) immediate charging until the maximum total cost is reached. Accordingly, the BMS 72 may consider the current energy cost and the consumer preferences to schedule (block 106) immediate charging of the backup devices. The BMS 72 may send a signal to the smart meter 33 to charge one or more of the backup devices 56, 58, 60, 62.

On the other hand, when there is ample time to charge the backup devices 56, 58, 60, 62, the BMS 72 may create and implement (block 108) a charging schedule to charge the backup devices at a reduced cost. As discussed previously, energy cost may generally be cyclical throughout a day, and may include periods of cheaper energy cost relative to the critical peak price (CPP). Therefore, the BMS 72 may selectively charge the backup devices 56, 58, 60, 62 during times when the energy cost is less than the CPP (e.g., during lower demand hours). For example, the charging schedule created and implemented (block 108) may charge the backup devices over a single period or over several periods before the power disturbance. For example, if the time available ($T_a$) is approximately 5 days and the time desired ($T_r$) is approximately 5 hours, the BMS 72 may charge the backup devices 56, 58, 60, 62 for approximately 1 hour each day while energy costs are lowest.

Additionally, the BMS 72 may utilize the consumer preferences when charging the backup devices 56, 58, 60, 62. For example, the consumer may specify minimum charge levels on each of the backup devices 56, 58, 60, 62, a maximum marginal cost or total cost of energy, or some combination thereof. In certain embodiments, the BMS 72 may charge the backup devices 56, 60, 62 only if the current marginal cost of energy is less than the maximum marginal cost specified by the consumer preferences.

After the BMS 72 schedules (block 106) immediate charging or creates and implements (108) a charging schedule to charge the backup devices 56, 58, 60, 62 at a reduced cost, the BMS 72 may periodically ping (block 110) the backup devices to ensure the charge level is maintained and/or still sufficient for the entire power disturbance period. For example, the BMS 72 may ping (block 110) at regular intervals, such as hourly or daily. As discussed previously, if the available charge of the backup devices 56, 58, 60, 62 falls below the desired level, the BMS 72 may send a signal to the smart meter 33 to direct power to charge one or more of the backup devices 56, 58, 60, 62. Further, the BMS 72 may continue to periodically ping (block 110) the backup devices 56, 58, 60, 62 until the BMS 72 has detected (block 112) a power disturbance.

In certain embodiments, the BMS 72 may detect (block 112) a power disturbance by receiving (block 94) notification from the utility service 12 that indicates the start of the power disturbance. The BMS 72 may then create and implement (block 114) a switching plan for the loads based on the consumer preferences. For example, the consumer facility 14 may be a hospital or other facility providing medical support to patients. The consumer facility 14 may include high priority loads, for example, (e.g., life supporting medical devices) which require power for the duration of the power disturbance. Accordingly, these high priority loads may, for example, be supported by the backup devices 56 and 58. However, the consumer may set additional charge points at corresponding price points. Additionally, the consumer may select to charge the third backup device (e.g., 60) to half of the maximum charge at one price point or fully charge the third backup device (e.g., 60) at a second lower price point. These preferences may be related to lower priority loads (e.g., air conditioning units) that the consumer would like to support during the disturbance period. As will be appreciated, the backup devices 56, 58, 60, and 62 may be designated for specific loads, which may have different priority levels. The BMS 40, 72 may automatically implement (block 114) the switching plan according to a priority of the loads, a maximum power consumption of each load, or a combination thereof. Additionally, the switching plan may be designed to create minimal inconvenience for the consumer. The BMS 72 may calculate an inconvenience factor based on the duration of the power disturbance, the priority of the loads, and the charge available on the backup devices 56, 58, 60, 62. Accordingly, the BMS 72 may use various algorithms and/or parameters including the inconvenience factor to create and implement (block 114) the switching plan.

As described in detail above, the disclosed embodiments relate to a system and method for managing the backup devices of a consumer during power disturbances in accordance with the consumer's preferences. Specifically, the consumer may input preferences to the backup managements system (BMS) 72 of the home energy manager 71. The BMS 72, via the processor 74, may use the received preferences (e.g., the number of backup devices to be charged, the desired level of charge for each device, and the priority of the backup devices) and may additionally communicate with the smart meter 33 (e.g., to receive the charge levels of the backup devices) at the consumer facility 14 to automatically create and implement charging and switching schedules for the backup devices. As such, the disclosed embodiments may reduce or minimize the inconvenience of a power disturbance at the consumer facility 14.

This written description uses examples to disclose the invention, including the best mode, and also to allow any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a smart meter connected to a utility service, a plurality of backup devices, and a consumer facility, wherein the smart meter is connected:
between the utility service and the consumer facility; and
between the plurality of backup devices and the consumer facility;
wherein the utility service provides a main source of power to the consumer facility and the plurality of backup devices provide a backup source of power to the consumer facility independent of the utility service;
wherein the smart meter includes a backup management system configured for communicating with the consumer facility;
wherein the backup management system is configured to:
receive a plurality of consumer preferences related to charging the plurality of backup devices;
receive a notification of a predicted power disturbance indicating that the utility service is predicted to be unable to provide the main source of power to the consumer facility, the notification including a time before the predicted power disturbance and a disturbance time period;
determine a desired charge based on the plurality of consumer preferences and the disturbance time period;
determine an available charge based on a charge status of each of the plurality of backup devices; and
determine, if the desired charge is greater than the available charge, a time to charge the plurality of backup devices such that the available charge reaches the desired charge; and
create, if the time before the predicted power disturbance is greater than the time to charge the plurality of backup devices, a charging schedule for charging the plurality of backup devices, wherein the charging schedule is based on energy costs over the time before the predicted power disturbance, the time before the predicted power disturbance, and the charge status of each backup device.

2. The system of claim 1, wherein each backup device includes a battery or uninterruptable power supply.

3. The system of claim 1, wherein the consumer preferences include load capability and minimum charge for each backup device.

4. The system of claim 1, wherein the backup management system is further configured to receive a charge level of each backup device, and ping each backup device to determine the charge status thereof.

5. The system of claim 4, wherein the desired charge is determined based on selected loads of the consumer facility as selected by a user.

6. The system of claim 5, wherein the desired charge is determined based on a charge to support the selected loads of the consumer facility for the disturbance time period, wherein the charge to support the selected loads of the consumer facility is based on rates of power consumption of the selected loads of the consumer facility and the disturbance time period.

7. The system of claim 1, wherein a charge difference between the desired charge and the available charge is determined by subtracting the desired charge from the available charge.

8. The system of claim 1, wherein the backup management system is further configured to, if the time before the predicted power disturbance is less than the time to charge the plurality of backup devices, immediately charge selected backup devices as selected based on consumer preferences and current energy cost.

9. The system of claim 1, wherein when the predicted power disturbance occurs, the backup management system is further configured to implement a switching plan for switching among the plurality of backup devices.

* * * * *